United States Patent Office 3,345,384
Patented Oct. 3, 1967

3,345,384
HYDROGENATION OF SULFOLENES
Jan M. Oelderik and Pieter C. Aben, Amsterdam, Netherlands, assignors to Shell Oil Company, New York, N.Y., a corporation of Delaware
Filed July 18, 1966, Ser. No. 565,932
Claims priority, application Netherlands, Jan. 6, 1966, 66—130
3 Claims. (Cl. 260—332.1)

ABSTRACT OF THE DISCLOSURE

Sulfolanes are produced by first contacting sulfolene with a porous material, consisting of a zeolite or a silica- or alumina-containing material, and thereafter with a hydrogenation catalyst in admixture with the said porous material under hydrogenation conditions.

---

Figure 1:
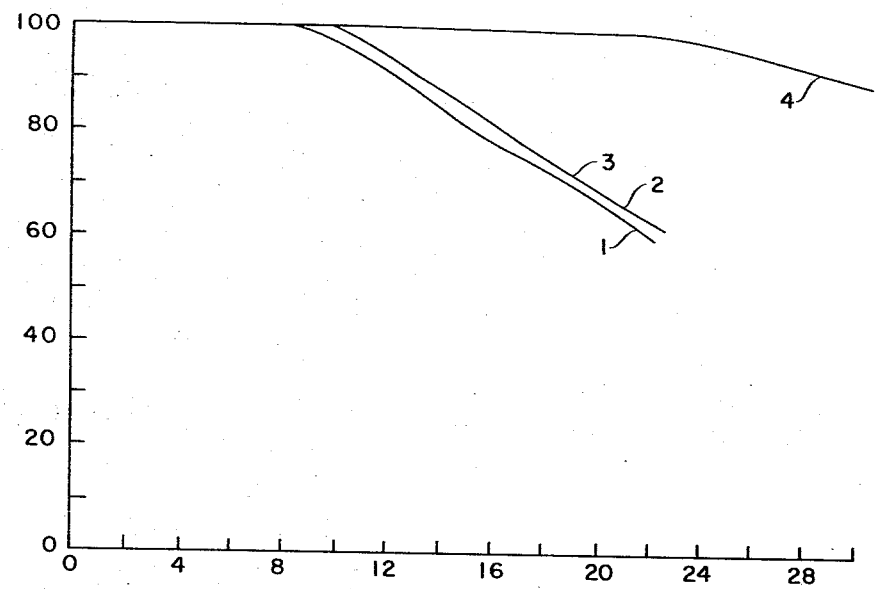

The present invention relates to an improved process for the hydrogenation of sulfolenes to sulfolanes.

The term "sulfolenes" as employed in the present specification and the appurtenant claims refers to and covers generally the substituted and non-substituted compounds containing a five-membered ring containing four carbon atoms and a sulfur atom, a single olefinic linkage between any two adjacent carbon atoms of said ring, and two oxygen atoms, each of which is directly attached to the sulfur atom of said ring.

The term "sulfolenes" therefore refers to the non-substituted sulfolenes, viz, 3-sulfolene, which possesses the following structure:

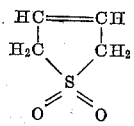

and 2-sulfolene, which possesses the following structure:

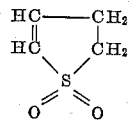

as well as to the various C-substituted derivatives thereof, i.e., sulfolenes in which one or more hydrogen atoms in the above formulae have been replaced by organic or inorganic radicals, and particularly hydrocarbon radicals, such as alkyl, alkenyl, aryl, aralkyl, alkaryl or alicyclic radicals. The sulfolanes to be prepared with the aid of the process according to the invention are then compounds with a structure like that of the sulfolenes as defined, but in which the double bond of the ring has been saturated with hydrogen.

The invention relates in particular to the hydrogenation of the sulfolenes with at most 16 carbon atoms in the molecule, whose structure may be represented by the following formulae:

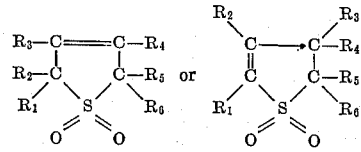

where $R_1$ to $R_6$ represent hydrocarbon radicals and/or hydrogen atoms and where the total number of carbon atoms in $R_1$ to $R_6$ is at most 12. Within this group, special preference is given to those sulfolenes which contain at most ten carbon atoms per molecule, to which belong the sulfolenes with at most six carbon atoms in the molecule. Examples of these are, besides 2- and 3-sulfolene, the methylsulfolenes, the dimethylsulfolenes and the ethylsulfolenes.

The invention relates in particular to a process for the hydrogenation of 3-sulfolene or 2-sulfolene, or mixtures thereof.

The sulfolanes prepared according to the process of the invention are useful as solvents for numerous organic compounds, and are used, for instance, in the oil and petrochemical industries as extracting agents for benzene, toluene and other aromatic hydrocarbons. It is further known that, by means of chemical reactions, sulfolanes may be converted into other valuable products, so that an attractive process for the preparation of sulfolanes is of commercial importance.

PRIOR ART

The hydrogenation of sulfolenes to produce the corresponding sulfolanes has long been known in the prior art. In view of the low thermal stability of the starting material, and of the heat of hydrogenation that is liberated during the reaction, it is often advisable to carry out the hydrogenation in dilute liquid phase, for example, in an organic medium such as sulfolane (see, e.g., U.S. Patent 2,451,298, issued Oct. 12, 1948, to Morris et al.).

In actual practice in this hydrogenation serious difficulties are encountered because catalyst life is comparatively short. This is probably due, at least partly, to the presence of sulfur dioxide and of polysulfones; but even if these contaminants have been removed from the starting material as much as possible or have been inactivated, the catalyst still proves soon to be poisoned.

OBJECTS

It is therefore an object of the present invention to provide a process for the hydrogenation of sulfolenes wherein the life of the hydrogenation catalyst is extended. Other objects, aspects and advantages of the invention will become apparent from the description of the invention.

THE DRAWING

Figure 2:
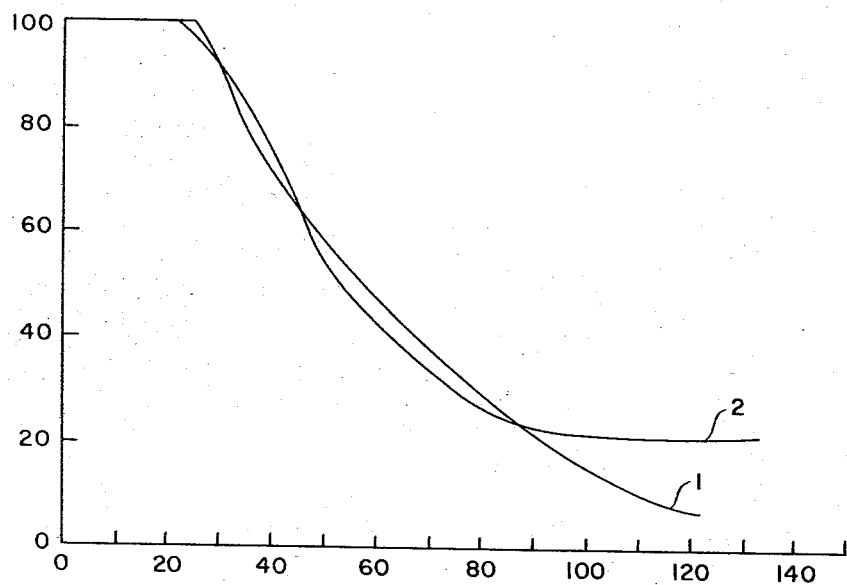

The invention is described in part with reference to the accompanying drawing, wherein:

FIG. 1 is a graphic representation showing the variation of conversion of sulfolene with the number of run hours, plotted with the data obtained from Example I; and FIG. 2 is a graphic representation of the variation in conversion of sulfolene with the number of run hours plotted from the data obtained from Example II.

THE INVENTION

It has now been found that catalyst life may be prolonged very considerably by taking care that the starting material, both before and during hydrogenation, is intimately contacted with a mass of particulate inert porous material.

By "inert porous material" is meant porous material which exerts hardly any direct influence on the hydrogenation of sulfolene, if at all, and which at the same time brings about hardly any side reactions and/or consecutive reactions of sulfolene and/or sulfolane, if at all.

The invention therefore relates to a process for the preparation of one or more sulfolanes from one or more sulfolenes through catalytic hydrogenation in a liquid medium, the starting material being intimately contacted, both before and during the hydrogenation, with a substantial amount of an inert porous material.

For good and economical running of the process, it is particularly important that regenerable porous material be applied. The completely or partially deactivated porous material is preferably regenerated periodically, and used afresh.

To the group of regenerable porous materials which are usable in the present process belong natural or synthetic zeolitic materials, or molecular sieves, or mixtures of zeolitic materials, in the non-acidic form. The term "molecular sieves" as herein used refers to solid crystalline zeolitic structures of well-defined intra-crystalline dimensions, which have the ability by reason of their intra-crystalline dimensions to allow the passage into or out of their crystalline cavities of only certain molecules, i.e., of molecules having particular size or shape. In addition to the zeolites, non-acidic silica- and/or alumina-containing materials, such as alkalinized silica-alumina and silica-magnesia, are readily utilizable. A very suitable porous material is silica.

The regeneration of the completely or partly deactivated porous materials may very suitably be effected by treating them, optionally after washing them with a suitable solvent such as an alcohol, e.g., methanol or isopropanol, with oxygen or an oxygen-containing gas, such as air, at elevated temperature, for instance, at a temperature between about 400 and 500° C. If desired, this regeneration may be improved by giving, prior to the oxygen treatment, a treatment with an inert gas, for instance, nitrogen, at a temperature between about 20 and 500° C. If the latter treatment is applied it should be carried out after the alcohol wash, if any is applied.

Preferably the hydrogenation of the sulfolenes is carried out by first contacting the starting material with the porous material (pretreatment bed) which does not contain any catalyst, and subsequently with the catalyst mixed with porous material.

If the pretreatment with porous material is omitted, and only the catalyst mixed with porous material is applied, a much smaller improvement of catalyst life is obtained. This is also the case when a pretreatment with porous material is indeed applied but the catalyst is not mixed with porous material. Preferably the reaction is effected with the aid of a substantial mass of a particulate porous material and a catalyst, each arranged as a fixed bed. Thus, very good results are obtained if these two beds (viz, pretreatment bed and bed of catalyst uniformly mixed with the porous material) are in the same vessel and preferably are adjacent to one another. The beneficial influence of the presence of porous material may be further enhanced by applying porous material which contains one or more alkaline substances or on which these alkaline substances are supported.

As alkaline substances are preferably applied one or more compounds of alkali and/or alkaline earth metals, in particular the oxides and/or hydroxides of these metals, such as sodium oxide and sodium hydroxide.

For smooth running of the process it has been found to be very advantageous to use as starting material for the hydrogenation one or more sulfolenes dissolved in a medium containing, besides one or more sulfolanes, one or more alcohols and/or one or more ethers.

It is preferred that the organic medium in which the hydrogenation is effected is the sulfolane which corresponds to the sulfolane to be prepared. For instance, 3-sulfolene or 2-sulfolene is preferably hydrogenated in an organic medium containing sulfolane, i.e., non-substituted sulfolane.

If desired, however, the sulfolane used in the organic medium and the sulfolane to be prepared may be different. Thus, for instance, 2,4-dimethylsulfolane may be present in the medium in which the hydrogenation of 3- and/or 2-sulfolene is performed, and mutatis mutandis the reverse.

The hydrogenation is preferably performed in a medium which at the start of the hydrogenation contains from about 15 to 80% by weight sulfolane or sulfolanes and from about 85 to 20% by weight of one or more lower alcohols and/or ethers. Very good results are obtained with an organic medium containing at the start of the hydrogenation from about 20 to 60% by weight of sulfolane or sulfolanes and from about 80 to 40% by weight of one or more lower alcohols and/or one or more ethers.

Within the category of alcohols and ethers particular preference is given to the alcohols and ethers with at most 6 carbon atoms per molecule. To these may belong the primary, secondary and tertiary alcohols as well as the cyclic ethers, such as dioxane and tetrahydrofuran. Very good results were obtained, for instance, with the alcohols with from 1 to 3 carbon atoms per molecule.

In the process according to the invention, in general, any hydrogenation catalyst, especially a Group VIII metal hydrogenation catalyst, may be applied. Preferably, however, a catalyst is chosen which contains one or more noble metals of Group VIII. The term "noble metals of Group VIII" herein refers to platinum, palladium, rhodium, iridium, osmium and ruthenium. If desired, however, the catalyst may be prepared from an alloy, for instance, from a nickel-aluminum alloy. An example of a catalyst of this kind is Raney nickel.

Preferably, the catalyzing metal is supported on a carrier. As carrier material for the catalyst, in general any suitable carrier material may be chosen, such as alumina- and/or silica-containing materials, for instance, alumina, silica, silica-alumina, silica-magnesia, and so forth. Preferably, silica is used as the carrier material. Excellent results are obtained, for instance, with a catalyst consisting of palladium supported on silica.

The amount of the metal, or metals, of the platinum group supported on the carrier may vary within very wide limits. As a rule this amount is between about 0.1 and 5% by weight, preferably between about 0.5 and 3% by weight, calculated on the amount of carrier material.

The hydrogenation is preferably effected in the presence of a regenerable catalyst. The completely or partly deactivated catalyst is then preferably regenerated periodically and used afresh.

The regeneration may very suitably be effected by treating the completely or partly deactivated catalyst at elevated temperature, for instance, from 400 to 500° C., with oxygen or an oxygen-containing gas, such as air, to oxidized carbonaceous material, and subsequently treating it with hydrogen or with hydrogen diluted with an inert gas at a temperature between about 100 and 500° C.

This regeneration may be considerably improved by carrying out, prior to the oxygen treatment, a treatment with an inert gas, such as nitrogen, at a temperature between 20 and 500° C. In addition, it is desirable carefully to remove the oxygen prior to the hydrogen treatment.

The regeneration may be further improved by carrying out, prior to the nitrogen treatment, a treatment with a liquid alcohol at elevated temperature. Very good results were obtained with methanol or isopropanol at a temperature between about 50 and 80° C.

As the hydrogen treatment mentioned above in the description of the catalyst regeneration does not adversely affect the regeneration of the porous material, the regeneration of the two may be effected by the same method. This is advantageous if the sulfolene reduction is carried out in a reactor in which pretreatment bed and catalyst bed are adjacent one another.

Although the hydrogenation may be effected at hydrogen partial pressures that may vary within wide limits, it is usually, for reasons of economy, not very attractive to use hydrogen partial pressures higher than about 200 atmospheres. Suitable hydrogen partial pressures include partial pressures of from about 5 to about 200 atmospheres, particularly of from about 25 to about 150 atmospheres, while, in particular, pressures between about 40 and about 120 atmospheres have given very good results.

Usually, from about 0.1 to about 4 liters of sulfolene per hour per liter of catalyst is passed through; rates of from about 0.5 to about 2 liters per hour are particularly preferred.

In principle, the process according to the invention may be carried out at any temperature up to, for example, 100° C. Preferably, however, the process according to the invention is effected at a temperature below about 50° C., preferably at a temperature between about 15 and about 40° C. Temperatures between about 18 and about 28° C. have given very good results.

The process according to the invention may be applied batchwise, semi-continuously or continuously. Particular conditions of operation will be apparent to those skilled in the art.

The continuous embodiment is preferably effected in the liquid phase with hydrogen recycle. Particular preference is given to application of the so-called trickle-phase technique, the material to be converted flowing over a catalyst in a very thin layer. This trickle technique has been described, for instance, in British Patent 657,521.

The following examples are given for illustrative purposes only, and are not intended to in any way limit the invention.

*Example I*

In order to investigate the influence of the porous material on catalyst life, four continuous experiments were carried out in a tubular reactor, the trickle-phase technique being applied. As catalyst was used palladium on silica containing 2% wt. palladium, the reaction conditions being as follows:

Reaction temperature _____° C__ 20
Hydrogen partial pressure _____atmospheres__ 77.6
Hydrogen:sulfolene, molar ratio _____ 10:1
Space velocity of starting material
               liters/hr./liter of catalyst__ 4.5

The starting material was a mixture containing 67.5% by weight isopropyl alcohol, 19.5% by weight sulfolane and 13% by weight 3-sulfolene.

In the first run, the starting material was passed over 10 liters (3.7 kg.) of catalyst only; in the second run, the starting material was passed first over 10 liters (6.3 kg.) of molecular sieves (pore diameter 4 A.), and immediately afterward over 10 liters (3.7 kg.) of catalyst; in the third run, the starting material was passed only over 10 liters (3.7 kg.) of catalyst mixed with 10 liters (6.3 kg.) of molecular sieves (pore diameter 4 A.), and immediately afterward over 10 liters (3.7 kg.) of catalyst mixed with 10 liters (6.3 kg.) of molecular sieves (pore diameter 4 A.).

The results of these experiments have been plotted in FIG. 1. On the vertical axis of this diagram the percentage conversion of sulfolene has been plotted, and on the horizontal axis the number of run hours of the experiments. Curve 1 shows the trend of the results obtained without the use of porous material; curve 2 that upon application of a pretreatment bed of porous material and of catalyst without any admixture; curve 3, which coincides with curve 2, that upon application of porous material in the catalyst bed; and curve 4 that upon application of porous material according to the invention.

From this diagram it follows clearly that under otherwise equal conditions the application of porous material before and during the hydrogenation prolongs catalyst life by a factor of over 2.5.

Similar results were obtained when molecular sieves with pore diameters of 5 and 13 A. were used.

*Example II*

In FIG. 2 the results are compared which have been obtained upon application of fresh porous material and fresh catalyst mixed with fresh porous material (curve 1) with those of regenerated porous material and regenerated mixture of catalyst and porous material (curve 2). On the vertical axis of FIG. 2 again the percentage conversion of sulfolene had been plotted and on the horizontal axis the number of run hours. From this diagram it follows that through regeneration the influence of the porous material and the activity of the catalyst are restored to their original values.

For regeneration, said materials were washed with warm (50–80° C.) isopropyl alcohol and were then successively treated with nitrogen (for 16 hours at 400° C.), with air (for 8 hours at 450° C.) and finally with hydrogen (for 1 hour at 400° C.). Prior to the treatment with hydrogen, the free oxygen was expelled from the system as far as possible with the aid of nitrogen. Subsequently, under the conditions described under Example I, the starting material was hydrogenated.

*Example III*

In the following run the procedure as described under Example I for the fourth run was followed. Instead of molecular sieves, however, silica and silica containing 10% by weight sodium (prepared by impregnating silica with an aqueous solution of sodium hydroxide with subsequent calcination) was used as the porous material.

Upon application of silica, it was found that before the conversion of sulfolene had dropped from 100% to 80%, about 2100 kg. sulfolene per kg. palladium was hydrogenated; upon application of the sodium-loaded silica this was found to be 2500 kg.

If no porous material is applied, only 1100 kg. sulfolene per kg. palladium are hydrogenated.

We claim as our invention:

1. In a process for the preparation of sulfolanes having up to six carbon atoms to the molecule from the corresponding sulfolenes, containing only carbon and hydrogen in addition to a sulfone group, by catalytic hydrogenation of said sulfolenes in a liquid organic medium over a supported Group VIII metal hydrogenation catalyst, the improvement comprising intimately contacting said sulfolenes with a mass of particulate inert porous material selected from the group consisting of zeolite molecular sieves, non-acidic silica and silica containing up to 10% by weight of sodium, and immediately thereafter intimately contacting said sulfolenes with a mass of said particulate porous material in substantially uniform admixture with said metal hydrogenation catalyst and a substantial amount of hydrogen, to produce sulfolanes.

2. A process in accordance with claim 1 wherein the sulfolene is an unsubstituted sulfolene and the sulfolane formed is unsubstituted sulfolane, and the catalyst is a Group VIII noble metal hydrogenation catalyst.

3. A process in accordance with claim 1 wherein the inert porous material is a non-acidic natural or synthetic zeolite.

References Cited

FOREIGN PATENTS 461,925    12/1949    Canada.

WALTER A. MODANCE, *Primary Examiner.*

C. M. SHURKO, *Assistant Examiner.*